Sept. 30, 1958 D. W. BARTON 2,854,285
AIR ATOMIZING NOZZLE

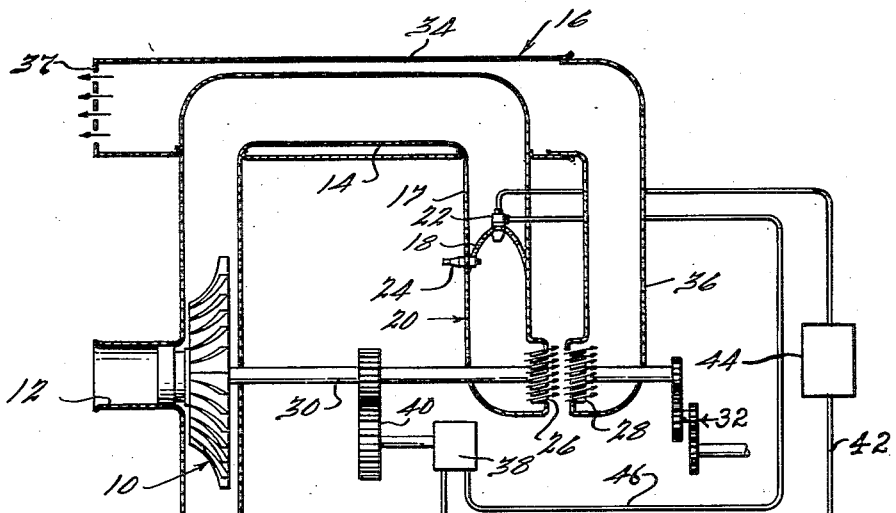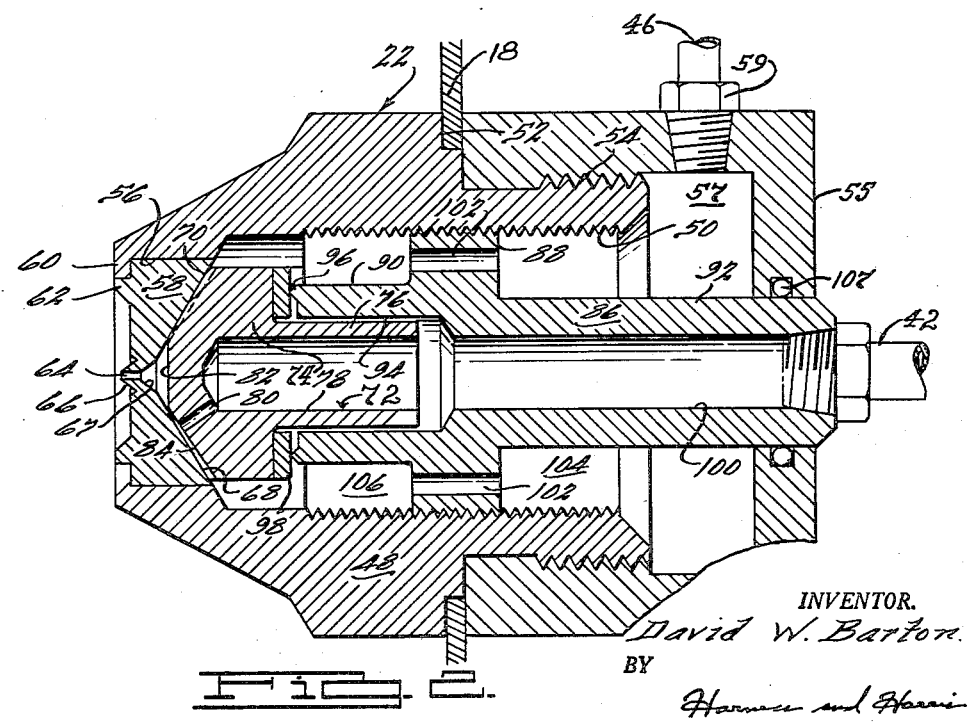

Filed June 4, 1954 2 Sheets-Sheet 2

INVENTOR.
David W. Barton
BY
Harness and Harris
ATTORNEYS

United States Patent Office 2,854,285
Patented Sept. 30, 1958

2,854,285

AIR ATOMIZING NOZZLE

David W. Barton, Birmingham, Mich., assignor to Chrysler Corporation, Highland Park, Mich., a corporation of Delaware Application June 4, 1954, Serial No. 434,439

1 Claim. (Cl. 299—120)

My invention relates generally to gas turbine power plants and to a fuel control system for use therewith, said fuel control system being effective to supply a controlled quantity of liquid fuel to the burner of a gas turbine power plant.

More particularly, my invention relates to a new and improved nozzle for use with a gas turbine fuel system, said nozzle being adapted to utilize pressurized air to atomize a controlled flow of liquid fuel and to produce an optimum distribution of liquid fuel particles within a gas turbine burner. I contemplate that the fuel system will incorporate a fuel-air pumping unit or the like for providing the nozzle of my invention with a controlled flow of both liquid fuel and air.

Various types of liquid fuel nozzles have been commonly employed with varying degrees of success in the gas turbine art for producing a combustible spray pattern of finely dispersed liquid fuel particles within the gas turbine burner with which they are used. These nozzles include various types of return-flow nozzles, certain forms thereof being provided with a "swirl chamber" portion to facilitate the mixing of the fuel and air. The rate of the nozzle discharge for the return flow nozzle may be selectively varied in response to controlled variations in the fuel pressure within a return flow fuel conduit communicating with the nozzle.

Another type of nozzle which is commonly employed includes a venturi element disposed within a nozzle air conduit, said venturi element being in communication with a fuel supply conduit means. A venturi pressure of reduced magnitude is produced within the venturi element thereby causing fuel to flow into the air conduit where it becomes atomized.

The characteristics of the above-mentioned fuel-air nozzles as well as other types of nozzles which have heretofore been employed in the art are such that adequate dispersion of the liquid fuel particles may not be obtained throughout the entire operating speed range of the power plant. Further, the fuel and air pressures required by these nozzles have been relatively high and therefore the size and capacity of fuel and air pumping means required to supply these nozzles have been undesirably large.

I have overcome these and other disadvantages by providing a new and improved nozzle which is adapted to completely atomize a controlled flow of liquid fuel throughout the normal operating speed range of the power plant with which it is used and which requires relatively low fuel and air pressures. Further, this new and improved nozzle is simple in design and is substantially trouble free during operation of the power plant.

I have provided my presently disclosed nozzle with a liquid fuel delivery passage and an intersecting air delivery passage, said passages being adapted to be connected to the previously mentioned fuel-air pumping unit. The air passing through the nozzle air passage is effective to shear liquid fuel particles from the intersecting fuel delivery passage and to finely disperse or atomize the same. Orifice means may be provided for allowing the atomized liquid fuel to be discharged into the associated gas turbine burner. By preference, the fuel delivery passage is centrally disposed within the nozzle assembly near the central nozzle axis and a plurality of air passages are disposed radially outward from the fuel delivery passage.

I have observed that a more uniform distribution pattern may be obtained when the air passages are regularly spaced about the fuel passage as in the presently disclosed embodiment.

The provision of a nozzle of the type referred to above being a principal object of my invention, it is a further object of my invention to provide an air atomizing liquid fuel nozzle for use with a gas turbine engine wherein the nozzle is effective to provide substantially complete dispersion of liquid fuel particles throughout the normal operating speed range of the gas turbine engine, as above described, to produce a readily combustible liquid fuel spray pattern.

Another object of my present invention is to provide an air atomizing nozzle for use with the fuel control system of a gas turbine engine wherein separate fuel and air passages are provided in the nozzle for respectively accommodating the flow of fuel and air, said fuel and air passages including intersecting branches, and wherein the air flow in the air passages is effective to shear the liquid fuel at terminal portions of the branches of the fuel passage thereby breaking up the liquid fuel into minute particles.

Another object of my invention is to provide a fuel nozzle of the air atomizing type as set forth in the preceding objects which is adapted to utilize relatively low fuel and air pressures to provide an atomized fuel distribution pattern of varying density, said fuel system including a fuel control valve means for adjusting the rate of delivery of liquid fuel to the nozzle to control the density of the distribution pattern.

Another object of my invention is to provide a nozzle assembly as above set forth in which provision is made for readily altering the fuel distribution pattern and the fuel mixing characteristics of the nozzle as desired.

Another object of my invention is to provide a new and improved air atomizing nozzle of simple construction which is particularly adapted for use with the burner of a gas turbine power plant but which is also capable of other uses.

In carrying forth the above objects I have provided a nozzle assembly comprising a central axially extending fuel passage means and an axially extending air passage means surrounding the central fuel passage. I have disposed a distributor element within an anterior portion of the nozzle assembly and it includes a plurality of branch fuel passages communicating wtih the above-mentioned central fuel passage. The distributor element is partly comprised of a portion which substantially forms a frustum of a cone, said frustum having the conical surface thereof provided with grooves which extend from the peripheral edge of the base frustum surface to the peripheral edge of the top frustum surface, said grooves partly defining a branch portion of the air passage means. The grooves intersect the branch fuel passages and according to one form of my invention, they are formed tangentially with respect to the peripheral edge of the top frustum surface of the distributor element. According to another embodiment of my invention, the distributor grooves are formed substantially perpendicular to the peripheral edge of the frustum portion of the distributor element and are disposed in planes which contain the central axis of the nozzle. It will readily become apparent that the grooves may also be formed at any intermediate position as desired.

The fuel mixing characteristics and the fuel distribution pattern of the nozzle of my present invention may be readily altered as desired by removing the distributor element and by replacing the same with another distributor element having the grooves thereof formed at a different angular position or having branch fuel passages threin which intersect the grooves at a different radial position.

I have provided within the nozzle assembly an adaptor having an internal conical surface which is adapted to be disposed in mating engagement with the conical surface of the distributor. A suitable central aperture is provided in this adaptor to permit the atomized fuel to escape from internal nozzle passages into the burner cone of the combustion chamber.

For the purpose of more particularly describing certain preferred forms of my present invention, reference will be made to the accompanying drawings wherein:

Figure 1 is a schematic representation of a power plant assembly incorporating the air atomizing nozzle of my present invention;

Figure 2 is a longitudinal sectional view of the nozzle assembly of my present invention showing portions thereof in elevation;

Figure 3:
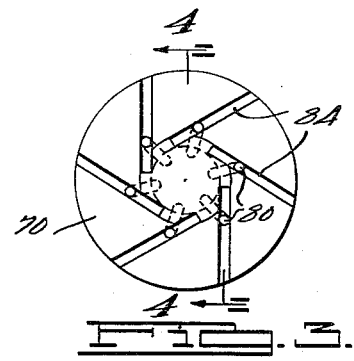
Figure 3 is an end view of one form of the distributor element of my present invention.

Referring first to the schematic power plant assembly view of Figure 1, a rotary compressor generally designated by numeral 10 is disposed adjacent an air intake opening 12 and is effective to compress the intake air. The pressurized intake air is then conducted through a portion 14 of a regenerator unit, this regenerator being generally designated by numeral 16. The compressed air becomes heated as it traverses through the regenerator unit 16 and the heated air is conducted through suitable conduit structure or baffling 17 to a burner cone 18 of a combustion chamber unit generally designated by numeral 20. The burner cone 18 may be suitably apertured to permit the entry of the compressed air to the interior of the combustion chamber unit 20.

I have generally shown the nozzle structure of my instant invention in Figure 1 and have designated the same by numeral 22. This nozzle structure is effective to supply the combustion chamber unit 20 with a supply of atomized liquid fuel. The fuel and air mixture within the combustion chamber unit 20 may be ignited by a suitable ignitor means 24 and the gases produced as a result of combustion are conducted through a two stage turbine unit, the primary stage thereof being shown at 26 and an associated second stage being shown at 28. The primary stage 26 is drivably connected to the rotary compressor unit 10 by a compressor drive shaft 30.

The secondary turbine stage 28 is drivably connected, as shown, to a suitable speed reduction transmission 32 which may be drivably connected to a power absorbing means such as the road wheels of an automotive vehicle. The combustion gases impart a driving torque to each of the turbine stages and then pass to another portion 34 of the regenerator unit 16 through a suitable conduit structure 36. A portion of the thermal energy of the hot exhaust gases passing through the regenerator portion 34 is transferred to the compressed intake air passing through the regenerator portion 14 which results in an increase in the operating efficiency of the engine. The exhaust gases are finally exhausted through a suitable exhaust passage means 37.

A fuel pumping unit is shown schematically in Figure 1 at 38 and a suitable pump drive means is provided at 40 for powering the pump 38, the input gear of the drive means 40 being drivably connected to the compressor drive shaft 30. A fuel supply conduit 42 extends from a fuel discharge portion of the pump unit 38 to the nozzle structure 22 and a suitable control valve means 44 may be interposed in this conduit 42 for the purpose of automatically regulating the supply of fuel to the nozzle structure 22. A suitable air supply conduit 46 extends from an air discharge portion of the pump unit 38 to the nozzle structure 22.

Having thus briefly described the operating cycle of a typical gas turbine power plant embodying my invention, reference will now be made to the sectional view of Figure 2. The nozzle assembly of Figure 2 includes a circular body portion 48 having a threaded central opening 50 and having a shoulder structure 52 disposed about the outer periphery. A posterior end of the body portion 48 is externally threaded, as shown at 54, to adapt the nozzle assembly to be threadably received within a suitable hollow nozzle adaptor or fixture 55. The adaptor 55 is effective to define a closed internal chamber 57 about the extension 86 and is in communication with the air supply conduit 46 by means of a suitable fitting 59. The anterior end of the adaptor and the nozzle shoulder 52 are adapted to clamp therebetween the peripheral edge of an aperture formed within the burner cone 18 and are effective to thereby retain the nozzle assembly in position.

The anterior end of the body portion 48 is provided with a cylindrical opening 56 of a reduced diameter. A cylindrical adaptor 58 is received within the opening 56 and engages an internally extending shoulder 60 disposed about the periphery of the cylindrical opening 56. A suitable pilot shoulder 62 may be provided, as shown, for the purpose of maintaining concentricity between the axes of the adaptor 58 and the nozzle assembly. A suitable central orifice 64 may be provided in the adaptor 58 as shown. I prefer that the central portion of the outer or forward face of the adaptor 58 should be recessed, as shown at 66, to define a sharp edge at the outer corner of the orifice 64. The inner face 68 of the adaptor 58 may be countersunk, if desired, in the vicinity of the orifice 64, as shown at 67. The inner face 68 may define an internal conical surface against which a mating conical surface 70 on the anterior end of a distributor element 72 is engaged.

I have formed the distributor element 72 with a main body portion 74 and a cylindrical extension 76, the main body portion 74 substantially defining a frustum of a cone. An axially extending bore 78 is formed within the cylindrical extension 76 and it terminates within the body portion 74. I have formed a plurality of branch passages 80 which extend from the interior bore 78 to the conical surface 70.

Figure 4:
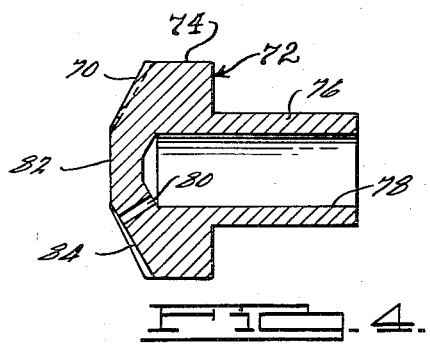
Figure 4 is a sectional view of the distributor element of Figure 3 taken along the section line 4—4 of Figure 3.

I have provided the distributor element 72 with a flat axial end surface 82 which defines the upper surface of the frustum or body portion 74. A plurality of grooves 84 are formed in the conical surface 70 and they extend from the peripheral edge of the surface 82 to the outer peripheral edge of the body portion 74. According to one embodiment of my invention, the grooves 84 are formed tangentially to the peripheral edge of the surface 82 and extend to the outer peripheral edge of the body portion 72. The distributor element of this embodiment is illustrated in Figures 3 and 4. Each of the branch passages 80 is situated so that it intersects individual ones of the grooves 84, as best observed in Figure 3.

I have formed a nozzle element shown at 86 with an externally threaded flange portion 88 and with oppositely directed axial extensions 90 and 92. The extension 90 is provided with a central cylindrical aperture 94 and an abutment portion 96. The nozzle element 86 is adapted to be threadably received within the threaded opening 50 in the nozzle body portion 48 and the cylindrical extension 76 of distributor element 72 is adapted to be slidably received within the central aperture 94. The distributor element 72 is held in place against the adaptor 58 by reason of the abutting contact between the abutment portion 96 of the extension 90 and a mating shoulder element or spacer 98 positioned against the main body portion 74 of the distributor 72.

The extension 92 is provided with an axially extending fuel passage 100 which communicates with the bore 78 of the distributor element 72. A suitable fitting 101 may be provided, as shown, for connecting the passage 100 with the fuel supply conduit 42. One or more axially extending passages 102 may be formed in the flange portion 88 of the nozzle element 86 to provide communication between an annular space 104 formed about the extension 86 and an annular space 106 formed about the extension 90. The passage means defined by the annular space 104, the passages 102, the annular space 106, and the grooves 84 is adapted to accommodate the flow of air from the air supply conduit 46 to the orifice 64 formed in the nozzle adaptor 58. If desired, a suitable sealing means 107 may be provided, as shown, for the purpose of preventing the leakage of air from within the chamber 57.

Figure 5:
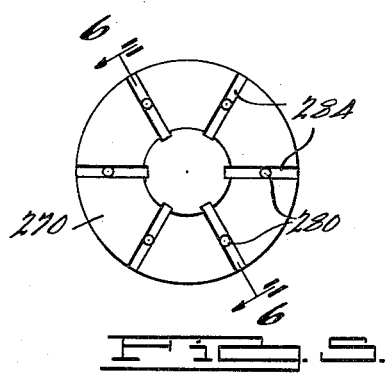
Figure 5 is an end view of another form of the distributor element of my present invention.
Figure 6:
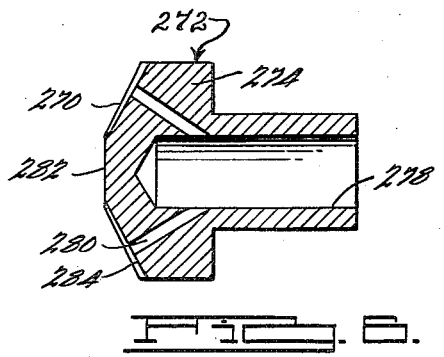
Figure 6 is a sectional view of the distributor element of Figure 5 taken along the section line 6—6 of Figure 5.

According to another modification, as best seen in Figures 5 and 6, I have provided a modified distributor element 272 which has the same general physical dimensions as the previously described distributor element 72. The distributor element 272 includes a central bore 278 which communicates through a plurality of branch fuel passages 280 with inwardly extending grooves 284 formed in a conical anterior surface 270. The grooves 284 are formed substantially along a line which intersects the central axis of the nozzle assembly and they extend in an inward direction from the outer peripheral edge of the main body portion 274 of the distributor element 272 to the peripheral edge of a flat axial end surface 282. The grooves 284 and the branch passages 280 intersect as shown.

The point of intersection of the branch fuel passages and the grooves of the respective distributor elements may be formed at any desired position along the respective conical surfaces. However, I prefer to form this intersection at a point relatively close to the peripheral edge of the upper frustrum surfaces of the respective distributor elements. For purposes of illustration, I have shown the branch passages 280 of the distribution element 272 at a radial position which is relatively distant from the central axis. However, it is apparent that these branch passages may also be formed closer to the central axis.

I have shown each of the distributor elements 72 and 272 with grooves which vary in depth, the deepest portion of the grooves being at the outermost radial position. However, I contemplate that these grooves may also be formed with a substantially uniform depth if desired.

The internal conical surface 68 of the adapter 58 cooperates with the grooves of the respective distributor elements to define a plurality of branch air passages and are effective to accommodate the flow of air therethrough for shearing off particles of liquid fuel within the branch fuel passages 280 at the points of intersection.

During the operation of the power plant, the fuel air pump unit 38 is driven by the first turbine stage 26, as previously described, and is effective to supply the fuel and air passages of the nozzle structure 22 with the required supply of fuel and air. The liquid fuel passes through the passage 100 and bore 78 within the nozzle assembly to the branch fuel passages of the distributor element and upon reaching the grooves formed in the conical surface of the distributor element it becomes immediately atomized by the flow of air through the branch air passages defined by the grooves. The atomized fuel is then passed through the central aperture 64 of the adaptor 58 into the burner cone of the power plant combustion chamber.

In the embodiment of Figures 3 and 4, a tangential velocity is imparted to the atomized fuel by virtue of the tangential disposition of the grooves 84 thereby aiding in the dispersion of the liquid fuel particles. In the embodiment of Figures 5 and 6, such a tangential velocity is lacking, and therefore the distribution pattern which may be obtained by using the distributor element of Figures 5 and 6 will be somewhat narrower and more localized than the distribution pattern that may be obtained by using the distribution element of Figures 3 and 4.

It will be readily apparent that the size of the orifice 64, the angle of the conical surfaces 68 and 70, the angle of the grooves formed on the respective distributor elements, the sizes of the fuel and air branch passages, and the other characteristic dimensions of the component elements of the assembly may be varied as desired in order to obtain various distribution patterns.

I have observed that the shearing effect of the air passing through the plurality of branch air passages upon the fuel in the branch fuel passages is effective to create a readily combustible spray pattern of liquid fuel particles throughout a relatively wide range of engine operating speeds. Further, the magnitude of the fuel and air pressures required by the nozzle to obtain complete dispersion is relatively low in comparison with the corresponding pressures required by conventional fuel-air nozzles generally employed in the gas turbine art.

What I claim and desire to secure by United States Letters Patent is:

An air atomizing nozzle comprising a body portion having an axially extending central opening, an adaptor disposed within one axial end of said central opening, the other end of said central opening being internally threaded, a central orifice formed in said adaptor, a nozzle distributor element positioned against said adaptor, said adaptor being provided with an internal conical surface on one axial side thereof, a portion of said distributor element comprising a frustum of a cone the conical surface of which is adapted to engage the internal conical surface of said adaptor, grooves formed on said distributor element on the conical surface thereof, said grooves extending from the base of said frustum to the periphery of the top surface of the same with a progressively decreasing depth, an externally threaded element threadably received in said other end of said central opening and adapted to retain said distributor element in engagement with said adaptor, at least one eccentrically disposed and axially extending passage formed in said threaded element, air passage means communicating with said grooves, said air passage means being defined in part by said passage and by said central opening centrally disposed fuel passage means, centrally located passages formed in said distributor element and in said threaded element defining in part said fuel passage means, a nozzle fixture threadably receiving said nozzle body portion, said fixture having a hollow interior communicating with said central opening, said threaded element having a portion extending through said fixture to accommodate a connection with a fuel supply conduit, the hollow interior of said fixture being adapted to communicate with an air supply conduit, and branch passage means extending from said fuel passage means and intersecting said grooves, said grooves individually intersecting certain ones of said branch passages at a point substantially proximate to said central orifice, said fuel and air passage means being respectively adapted to accommodate the flow of liquid fuel and air, said flow of air being effective to shear particles of liquid fuel at the point of intersection of said grooves thereby producing a finely atomized and combustible pattern of liquid fuel particles.

References Cited in the file of this patent

UNITED STATES PATENTS

| | | |
|---|---|---|
| 1,462,395 | Thompson | July 17, 1923 |
| 1,934,755 | Williams | Nov. 14, 1933 |
| 2,177,781 | Haynes et al. | Oct. 31, 1939 |
| 2,436,815 | Lum | Mar. 2, 1948 |
| 2,551,276 | McMahan | May 1, 1951 |
| 2,567,818 | MacCracken | Sept. 11, 1951 |
| 2,595,759 | Buckland et al. | May 6, 1952 |
| 2,607,193 | Berggren et al. | Aug. 19, 1952 |
| 2,623,786 | Wille | Dec. 30, 1952 |
| 2,635,425 | Thorpe et al. | Apr. 21, 1953 |